Feb. 12, 1935.	C. J. WERNER	1,991,035
SPLIT PHASE MOTOR
Original Filed Sept. 12, 1931

Inventor
CALVIN J. WERNER
By Spencer, Hardman & Fehr
Attorneys

Patented Feb. 12, 1935

1,991,035

UNITED STATES PATENT OFFICE 1,991,035

SPLIT PHASE MOTOR

Calvin J. Werner, Dayton, Ohio, assignor, by mesne assignments, to General Motors Corporation, Detroit, Mich., a corporation of Delaware Application September 12, 1931, Serial No. 562,466
Renewed November 24, 1933

9 Claims. (Cl. 172—279)

This invention relates to improvements in electric motors.

It is among the objects of the present invention to provide a simple and inexpensive automatic starting circuit control device for a split phase motor.

Another object of this invention is to provide a simple and efficient control system for single phase motors.

Further objects and advantages of the present invention will be apparent from the following description, reference being had to the accompanying drawing wherein a preferred embodiment of one form of the present invention is clearly shown.

Figure 1:
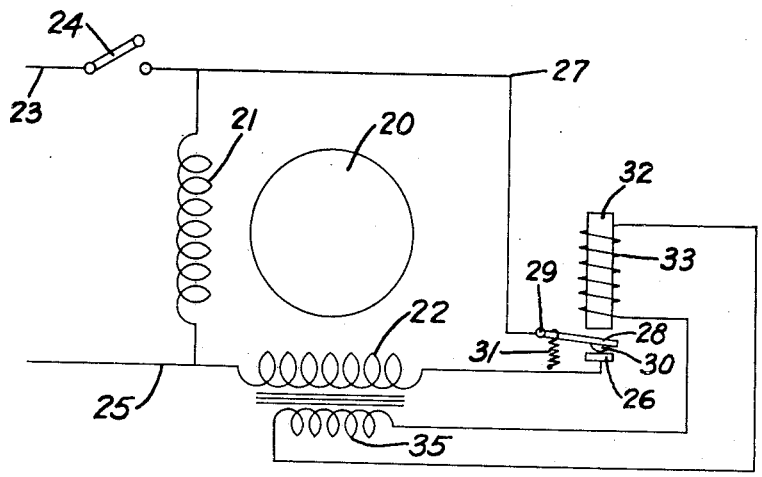
Fig. 1 is a diagrammatic view showing the circuit connections of the improved split phase motor starting device.

Referring to the drawing, the numeral 20 designates the rotor of the electric machine. The main or running winding of the machine is designated by the numeral 21 and the starting winding by the numeral 22. One of the power lines designated by the numeral 23 is connectible with one side of the main windings 21 through a switch 24. The other power line 25 is connected to the opposite side of the main winding 21 to which one end of the starting winding 22 is also connected. The opposite end of the starting winding is connected with a stationary contact 26 of the electro-magnetic switch. The end of the main winding 21, connected to the power line 23, is connected through wire 27 with the contact carrying arm 28 of the electro-magnetic switch, which arm is pivoted as at 29. A contact 30 on arm 28 is yieldably urged into engagement with the stationary contact 26 in any suitable manner, a spring 31 being shown for this purpose. The magnetic switch includes also a core 32 about which the magnet winding 33 is wound. One end of the magnet winding is connected to one end of a potential coil 35 carried within the motor in any suitable manner so as to be in inductive relation with the rotor of said motor. In Fig. 1, coil 35 is shown to be in such a position that it has practically no effective magnetic coupling with the main winding 21, the term "effective", here, referring more particularly to the effectiveness of the flux or magnetic coupling in inducing a voltage. The opposite end of the electro-magnet winding 33 is connected with the other end of the potential coil 35, thus winding 33 receives its energy from coil 35 to operate the electro-magnet switch.

In starting, the motor switch 24 is closed, completing the power circuit through the main winding 21 as well as through the starting winding 22 via the contacts 26 and 30, arm 28 and wire 27 to provide a starting circuit. As the motor speed increases, the potential induced within the coil 35 is relatively increased, said potential being directed to the electro-magnetic switch winding 33, causing the core 32 to be energized to attract the contact carrying arm 28. When arm 28 is attracted to move its contact 30 out of engagement with the contact 26, the circuit through the starting winding 22 is broken to provide a running circuit; consequently only the main winding 21 of the electric machine will be in circuit during the normal operation of said electric machine.

When switch 24 is moved to close the starting circuit, coil 35, in inductive relation with the starting winding 22, has a voltage induced therein which is directed to the switch winding 33. This voltage, however, is not sufficient to energize the electro-magnet of the switch to lift the contact carrying arm 28. To effect lifting of arm 28, another component is required. This is provided through the action of the rotor field set up by the currents induced in the rotor from the field about the coil 21. That is, as the rotor speed increases, the currents, set up in the rotor by virtue of its conductors cutting the field of the winding 21, increase. At the same time, the field due to those currents becomes stronger and cuts the winding 35 more rapidly to effect an increase in the voltage induced in the coil 35. It is easily understood that it is the voltage induced in the coil 35 by virtue of rotor currents and rotation that effects the actuation of the switch. Since that voltage is governed by the number of turns in the coil 35 and the coupling between the coil 35 and the rotor, the desired voltage for actuating the switch is easily predetermined. A preferable and desirable feature is to obtain a substantially high percentage voltage change between zero speed and switching speed, so that less sensitivity and more rugged construction and operating characteristics are permitted in the switch. For these reasons, magnetic coupling between the main winding 21 and the coil 35 is undesirable, because such magnetic coupling would induce a substantially constant voltage in the coil 35, and thus reduce the percentage of change in voltage across the coil 35 in starting. For the same reason, magnetic coupling between the starting winding and the coil 35 effects no advantage in the operation of the switch in starting. It has been found, however, that the elimination of the magnetic coupling with the main winding is the more desirable. The fact that the switch is electromagnetically held in the open position to open the circuit to the starting winding shows that the switch operating voltage is induced from the rotor. This increased potential when vectorially added to the potential existing in the coil 35 will energize winding 33 of the electro-magnetic switch to lift arm 28 and open the starting circuit. The potential induced in the winding 35, due to the conductors of the winding 35 cutting the rotor field, is sufficient to maintain the arm 28 in the circuit breaking position after it has once been operated to that position.

Figure 2:
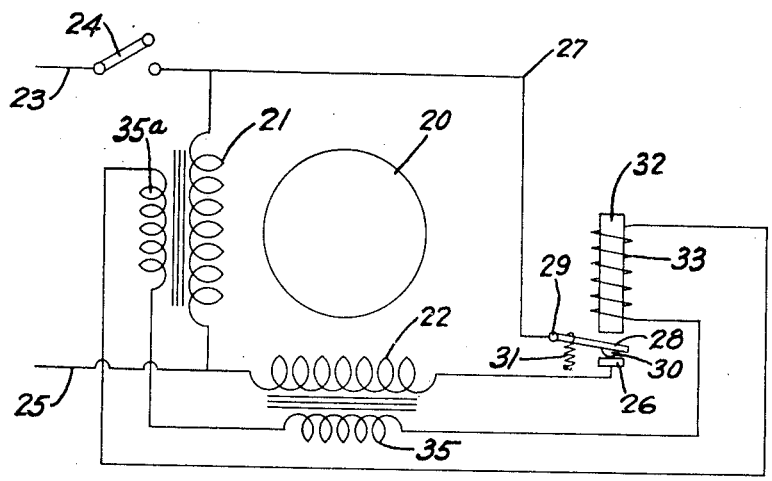
Fig. 2 is a view similar to Fig. 1 showing a modified circuit for the device.

In the Fig. 2 a modified form of the invention is illustrated. The potential coil is divided into two parts 35 and 35a, the former being in inductive relation with the starting winding 22, the later 35a in inductive relation with the running winding 21 of the motor. Here induced voltage is not only obtained from the coil 35 in inductive relation with said starting winding and the coupling between coil 35 and running winding 21 as disclosed in Fig. 1, but an added component of voltage is introduced into the magnet circuit of the switch, said component resulting from the inductive coupling between the coil portion 35a and running winding 21. The number and direction of turns and winding connections of coils 35 and 35a in both Figs. 1 and 2 are such that the switch will not operate until the rotor has reached a predetermined speed, and the switch will remain operated after once being operated until the switch 24 is opened or some abnormal condition such as overload occurs.

From this it may be seen that a simple and inexpensive automatic starting circuit control device for a split phase motor is provided by the addition of an ordinary coil into the motor which may be placed in inductive relation with the motor windings without necessitating extensive alterations in the design of existing motor parts.

While the form of embodiment of the present invention as herein disclosed, constitutes a preferred form, it is to be understood that other forms might be adopted, all coming within the scope of the claims which follow.

What is claimed is as follows:

1. A starting circuit for a motor having a plurality of windings and a rotor, displaced from each other in space by substantially 90 electrical degrees, and an electromagnetic switch for controlling the current flow to one of the field windings; and a winding in space phase with one of the motor windings and magnetically associated with the rotor for energizing the electromagnetic switch to control said contacts.

2. A starting circuit for a split phase motor having starting and running windings and a rotor, comprising, in combination, an electromagnetic switch normally connecting the starting winding in circuit with the running winding; and a potential coil in space phase with the starting winding and in inductive relation with the rotor for providing a potential for operating the switch to open the starting winding circuit, said potential coil being connected to the electromagnetic switch.

3. A starting device for a motor having a rotor and a plurality of windings comprising, in combination, an electromagnetic switch having normally closed contacts connecting one of the motor windings in circuit relation; and a winding magnetically associated with the rotor and effectively substantially magnetically segregated from one of the motor windings for energizing the switch to open the contacts.

4. A starting device for a single phase motor having a rotor and starting and running windings, comprising, in combination, circuits for the starting and running windings, an electromagnetic switch for controlling the starting winding circuit; and a potential coil magnetically associated with the rotor and having practically no effective magnetic coupling with the running winding, said potential coil being connected to the switch and having a voltage induced therein for operating the switch to change the starting winding circuit.

5. An induction motor circuit comprising, in combination, a main winding; an auxiliary winding; a rotor magnetically associated with the windings; a coil magnetically associated with the rotor and having less effective magnetic coupling with one of the first mentioned windings than with the other of the first mentioned windings; an electromagnetic switch having an electromagnet winding connected to said coil and having contacts operatively associated therewith; a power supply line, said contacts being connected to control the current flow from the power supply line to the auxiliary winding; said coil having a voltage induced therein by virtue of said magnetic association with the rotor so that said switch is actuated responsively to rotor speed.

6. A starting circuit for a motor having a rotor and a plurality of windings, comprising, in combination, an electromagnetic switch for controlling the operation of one of said windings, and a winding magnetically coupled with the rotor and having practically no direct effective magnetic coupling with one of the motor windings, the last mentioned winding having a voltage induced therein for energizing said electromagnetic switch.

7. A starting circuit for a motor having a rotor, a main field winding and an auxiliary field winding, comprising, in combination, an electromagnetic switch having contacts for controlling the operation of said auxiliary winding; and an additional winding within the field of magnetic influence of the rotor, said additional winding having practically no voltage induced therein at any time by virtue of the magnetic field of the main winding, and said additional winding being connected to the electromagnetic switch to energize the electromagnet after the motor has started.

8. An induction motor circuit comprising, in combination, a main winding; an auxiliary winding; a rotor magnetically associated with said windings; a coil within the field of magnetic influence of the rotor and having a voltage induced therein by the rotor flux which voltage varies with rotor speed; said coil having a lower voltage induced therein by the main field winding than by the auxiliary field winding; an electromagnetic switch having an electromagnet winding connected to said coil and having contacts operatively associated therewith; a power supply line; said auxiliary winding being connected to the power supply line through the contacts; the voltage induced in said coil from said windings being insufficient at any time to actuate the switch and being substantially zero when said contacts are open, said switch being responsive to the change in voltage induced in said coil by the rotor flux to effect control of the connection between said power supply line and auxiliary winding.

9. An induction motor circuit comprising, in combination, a main field winding; an auxiliary winding; a rotor magnetically associated with said windings; a coil within the field of magnetic influence of the rotor and having a voltage induced therein by the rotor flux, which voltage varies with rotor speed; an electromagnetic switch having an electromagnet winding connected to said coil and having contacts operatively associated therewith; a power supply line; said auxiliary winding being connected to the power supply line through the contacts; the voltage across said coil that is induced therein by the flux of said windings being practically zero when said contacts are open; said switch being responsive to the voltage induced in said coil by the rotor flux to effect control of the connection between said power supply line and auxiliary winding.

CALVIN J. WERNER.